(12) United States Patent
Tsai et al.

(10) Patent No.: US 10,048,536 B2
(45) Date of Patent: Aug. 14, 2018

(54) LIGHT GUIDE PLATE AND ASSEMBLY THEREOF

(71) Applicant: Global Lighting Technologies Inc., Taoyuan (TW)

(72) Inventors: Chung-Lin Tsai, Taoyuan (TW); Ching-Ling Wang, Taoyuan (TW); Ping-Tse Lo, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 45 days.

(21) Appl. No.: 15/390,546

(22) Filed: Dec. 26, 2016

(65) Prior Publication Data

US 2017/0108720 A1    Apr. 20, 2017

Related U.S. Application Data

(63) Continuation-in-part of application No. 15/210,875, filed on Jul. 14, 2016, now Pat. No. 9,568,666, which is a continuation of application No. 14/838,289, filed on Aug. 27, 2015, now Pat. No. 9,429,697, and a continuation-in-part of application No. 14/838,380, (Continued)

(51) Int. Cl.
| | |
|---|---|
| *G02F 1/13357* | (2006.01) |
| *F21V 8/00* | (2006.01) |
| *G02F 1/167* | (2006.01) |
| *G02F 1/1335* | (2006.01) |
| *G02F 1/1333* | (2006.01) |

(Continued)

(52) U.S. Cl.
CPC ......... *G02F 1/1336* (2013.01); *G02B 6/0031* (2013.01); *G02B 6/0043* (2013.01); *G02B 6/0065* (2013.01); *G02B 6/0083* (2013.01); *G02F 1/13338* (2013.01); *G02F 1/167* (2013.01); *G02F 2001/133616* (2013.01); *G02F 2202/28* (2013.01); *G02F 2203/02* (2013.01); *G06F 3/044* (2013.01); *G06F 3/045* (2013.01)

(58) Field of Classification Search
CPC .. G02F 1/1336; G02F 1/133616; G02F 1/167; G02F 2001/133616; G02F 2202/28; G02F 2203/02; G02B 6/0031; G02B 6/0043; G02B 6/0065; G02B 6/0083; G06F 3/044; G06F 3/045
See application file for complete search history.

(56) References Cited

U.S. PATENT DOCUMENTS

| | | | | |
|---|---|---|---|---|
| 9,004,737 | B2 * | 4/2015 | Tsai | G02B 6/0083 |
| | | | | 362/630 |
| 2006/0290685 | A1 * | 12/2006 | Nagakubo | G02B 6/0068 |
| | | | | 345/175 |
| 2009/0073347 | A1 * | 3/2009 | Takahashi | G02B 6/002 |
| | | | | 349/65 |

* cited by examiner

*Primary Examiner* — Mary Ellen Bowman
(74) *Attorney, Agent, or Firm* — JCIPRNET

(57) ABSTRACT

A light guide plate and assembly thereof are disclosed. The light guide plate includes a base plate, an optical pattern on the bottom surface of the base plate, a first circuit and a second circuit on the top surface of the base plate. As a front light module, the first circuit is designed to be light penetrable at the visual area of the base plate as a touch sensing circuit, and the second circuit is surrounding and electrically connected the first circuit. The front light module achieves the thickness reduction of a mobile device having a reflective type panel. As a back light module, the first circuit and the second circuit are arranged in two adjacent blocks on the top surface of the base plate without electrically connecting to each other. The back light module may be applied to perform a local dimming technology by adapting an extra low resolution panel.

20 Claims, 7 Drawing Sheets

Related U.S. Application Data filed on Aug. 28, 2015, now Pat. No. 9,429,702, said application No. 14/838,289 is a continuation-in-part of application No. 14/606,031, filed on Jan. 27, 2015, now Pat. No. 9,322,971, said application No. 14/838,380 is a continuation-in-part of application No. 14/606,031, which is a continuation-in-part of application No. 13/911,102, filed on Jun. 6, 2013, now Pat. No. 9,004,737, which is a continuation-in-part of application No. 13/172,882, filed on Jun. 30, 2011, now Pat. No. 8,480,286, which is a continuation-in-part of application No. 12/464,104, filed on May 12, 2009, now Pat. No. 7,997,784.

(51) Int. Cl.
*G06F 3/044* (2006.01)
*G06F 3/045* (2006.01)

LIGHT GUIDE PLATE AND ASSEMBLY THEREOF

CROSS-REFERENCE TO RELATED APPLICATION

This application is a continuation-in-part application of and claims the priority benefits of U.S. prior application Ser. No. 15/210,875, filed on Jul. 14, 2016, now pending.

BACKGROUND

Technical Field

The technical field generally relates to a surface light source. More particularly, the technical field relates to a light guide plate and an assembly thereof.

Description of Related Art

A light guide plate is a light transmittable plate, and the operation principle thereof is similar to that of the optical fiber. A pattern on the surface of the light guide plate is essential for the light guide plate to achieve a uniform surface light source despite the decay due to the distance of the light source, such as a LED light bar.

The light guide plate is usually adopted as a major component of a backlight module. The backlight module provides illumination and is commonly used in a liquid crystal display (LCD). As a LCD does not produce light by itself, the light of the backlight module penetrate the LCD and carry out the image display. Thus, a LCD may also be defined as a penetrative type panel.

Recently, the light guide plate is also applied as a front light module of some reflective type panel, such as the electro phonetic display (EPD). The EPD requires the environment light source to make it visible, and thus the front light module is arranged above the EPD.

SUMMARY

One aspect of the disclosure is to provide a light guide plate and an assembly thereof to reduce the overall thickness and the fabrication cost of a reflective type panel.

According to one embodiment of the aspect, a light guide plate to integrate a LED at the lateral side of itself, and disposed above a reflective type panel is disclosed. The light guide plate includes a base plate, an optical pattern disposed at the bottom surface of the base plate, a first circuit integrated on the top surface of the base plate, and a second circuit integrated around the first circuit. The first circuit is optical penetrable, and the second circuit electrically connects the first circuit. Therefore, the first circuit may be arranged in a visual area of the reflective type panel, and the second circuit is hid below the rim of the reflective type panel.

According to embodiments of the aspect, the material of the base plate must be light transmittable and also be able to tolerance the thermal process for forming the first and second circuit thereon. Therefore, the meet materials include the polycarbonate (PC), the polyethylene terephthalate (PET), the Polystyrene (PS) and the Polymethyl methacrylate (PMMA), and the detail is disclosed in embodiments.

According to embodiments of the aspect, the first circuit is a touch sensing circuit, such as a capacitive-type touch sensing circuit or a resistive-type touch sensing circuit. Meanwhile, the material of the first circuit may be achieved by using the nanowire circuit or the indium tin oxide (ITO) with low temperature process.

According to one embodiment of the aspect, the light guide plate also includes a third circuit disposed above the base plate and electrically connected to the LED. Particularly, the third circuit is electrically connected to the LED via a flexible printed circuit (FPC) board in an embodiment.

Another aspect of the disclosure is to provide a light guide plate assembly to reduce the overall thickness and the fabrication cost of a reflective type panel.

According to one embodiment of the aspect, the light guide plate assembly applied above a reflective type panel includes a base plate, an optical pattern disposed at the bottom surface of the base plate, a first circuit integrated on the top surface of the base plate, a second circuit integrated around the first circuit, a first optical clear adhesive layer disposed above the top surface of the base plate and a second optical clear adhesive layer disposed below the bottom surface of the base plate. The first circuit is light penetrable, and the second circuit is arranged around and electrically connects the first circuit. The first optical clear adhesive layer covers the first circuit to adhere a cover plate, and the second optical clear adhesive layer covers the optical pattern to adhere the reflective type panel.

According to one embodiment of the aspect, the base plate is made by the material selected from the group of the polycarbonate (PC), the polyethylene terephthalate (PET), the Polystyrene (PS) and the Polymethyl methacrylate (PMMA). Meanwhile, the first circuit is a capacitive-type touch sensing circuit or a resistive-type touch sensing circuit made by a nanowire circuit or other equalities optical penetrable.

According to the other embodiment of the aspect, the light guide plate assembly also includes a third circuit disposed above the base plate and electrically connected to the LED. Particularly, the third circuit is electrically connected to the LED via a flexible printed circuit (FPC) board.

The other aspect of the disclosure is to provide a light guide plate assembly being applied below a penetrative type panel. The light guide plate assembly provides a local dimming mechanism to the penetrative type panel.

According to one embodiment of the aspect, the light guide plate assembly includes a light guide plate to integrate a LED at the lateral side of itself, an optical pattern disposed at the bottom surface of the light guide plate, a first circuit integrated on the top surface of the light guide plate, and a second circuit integrated on the top surface and adjacent to but not electrically connected to the first circuit.

According to another embodiment of the aspect, the material of the light guide plate must be light transmittable, suit to make large size and also be able to tolerance the thermal process for forming the first and second circuit thereon. Therefore, the meet materials include the polycarbonate (PC), the thermoplastic olefin polymer of amorphous structure (COC) and the cyclic block copolymer (CBC), and the detail is disclosed in embodiments.

According to another embodiment of the aspect, the first or second circuit may be achieved by a silver paste circuit. Particularly, the silver paste circuit is adapted on the light guide plate by a low temperature process reach to 90~110 Celsius degrees.

According to the other embodiments of the aspect, the light guide plate assembly further includes a liquid crystal cell plate arranged above the light guide plate. In detail, a control circuit is disposed above the liquid crystal cell plate, and the control circuit takes the first circuit as a first locally ground voltage to generate a first electric field on the liquid crystal cell plate. Meanwhile, the control circuit also takes the second circuit as a second locally ground voltage to generate a second electric field on the liquid crystal cell plate. Particularly, the control circuit may be designed to electrically connect the penetrative type panel, and follow an operating signal which is made by downgrading the resolution of the penetrative type panel. Therefore, the local dimming mechanism is achieved in the light guide plate assembly.

Based on the description described above, in the light guide plate and assembly for front light module of the present disclosure, the LED is integrated at the lateral side of the light guide structure, and the first circuit layer is integrated on the top surface of the light guide plate. With such configuration, the first circuit layer for touch control is integrated with the light guide plate to form the light guide plate assembly with light guiding and touch control functions. Also, the LED is integrated at the lateral side of the light guide plate with or without having to be disposed on an additional circuit board. Therefore, the overall thickness and the production cost of the light guide plate assembly may be reduced. Meanwhile, in the light guide plate assembly for back light module of the present disclosure, the first circuit is applied to be a locally ground voltage to generate a locally electric field, and thus the local dimming mechanism is achieved thereby.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
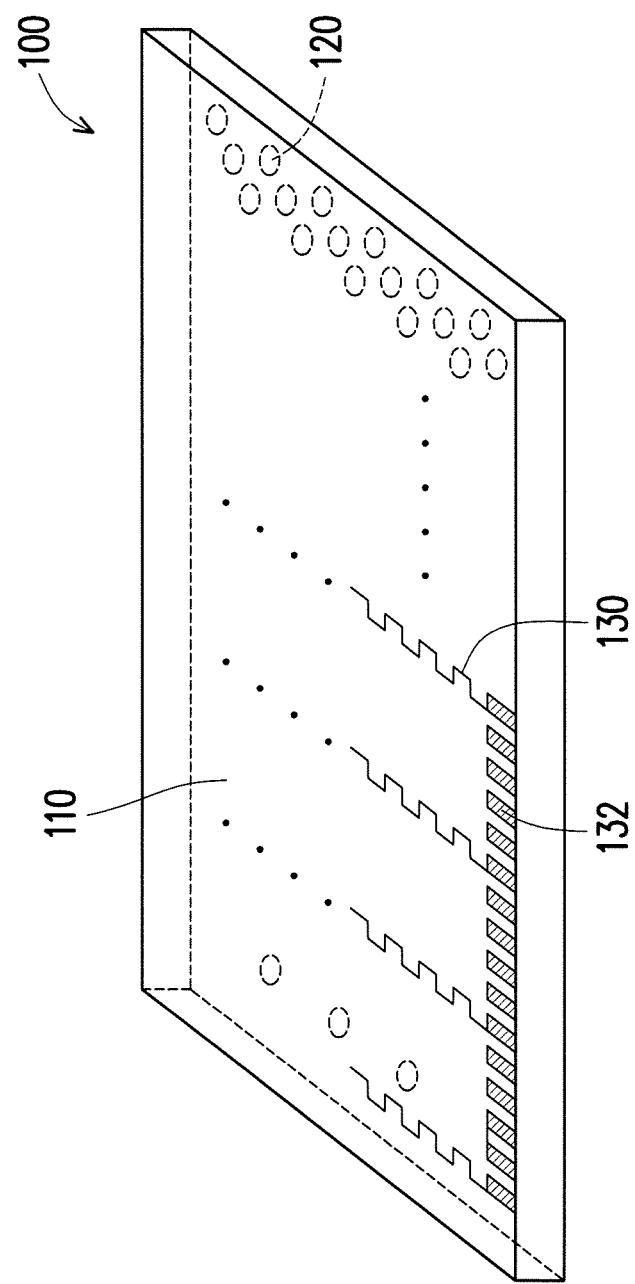
FIG. 1 depicts a light guide plate according to one embodiment of the disclosure.

In the following detailed description of the preferred embodiments, reference is made to the accompanying drawings which form a part hereof, and in which are shown by way of illustration specific embodiments in which the invention may be practiced. Wherever possible, the same reference numbers are used in the drawings and the description to refer to the same or like parts. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected", "coupled", "disposed", and "mounted" and variations thereof herein are used broadly and encompass direct and indirect connections, couplings, and mountings. Accordingly, the drawings and descriptions will be regarded as illustrative in nature and not as restrictive.

FIG. 1 depicts a light guide plate according to one embodiment of the disclosure. In the embodiment, the light guide plate 100 may be adopted as a front light module for a reflective type panel, such as an electro-phoretic display (EPD). The light guide plate 100 includes a base plate 110, an optical pattern 120 on the bottom surface of the base plate 110, a first circuit 130 and a second circuit 132 on the top surface of the plate 110. For clarity of the figures, it is noted that the optical pattern 120, the first circuit 130, and the second circuit 132 in FIG. 1 are partially depicted for illustration purpose, the layout thereof is not limited in the disclosure.

When discussing about the base plate 110, a traditional transparent plastic substrate, i.e. the polyimide (PI) for carrying circuits, is unacceptable due to the twinned crystal molecular structure allowing light to pass through but not allowing light to be transmitted therein. On the other hand, the base plate 110 must be able to tolerance the thermal process for integrating the first circuit 130 and the second circuit 132 on the top surface without (1) burning the base plate 110 to a yellow colour or named oxidized, (2) warping the base plate 110, and (3) damaging the shape of the optical pattern 120.

Therefore, the adequate material for the base plate 110 is a light transmittable plastic, such as the polycarbonate (PC), the polyethylene terephthalate (PET), the polystyrene (PS), the polymethyl methacrylate (PMMA), etc. Herein, the polystyrene (PS) and the polymethyl methacrylate (PMMA) may be suit to form the base plate 110 by an injection mold process, and the polycarbonate (PC) and the polyethylene terephthalate (PET) may be suit to form the base plate 110 by an embossing process.

In detail, some modifier, such as the antioxidant, may be added in the material of the base plate 110 especially for the injection mold process. Furthermore, a hard coating process performed on the base plate 110 before the first circuit 130 and the second circuit 132 are integrated on the base plate 110 may be applied in the embossing process to prevent the warp. The nitrogen and/or vacuum process may be applied to prevent the base plate 110 from being coloured.

Figure 2:
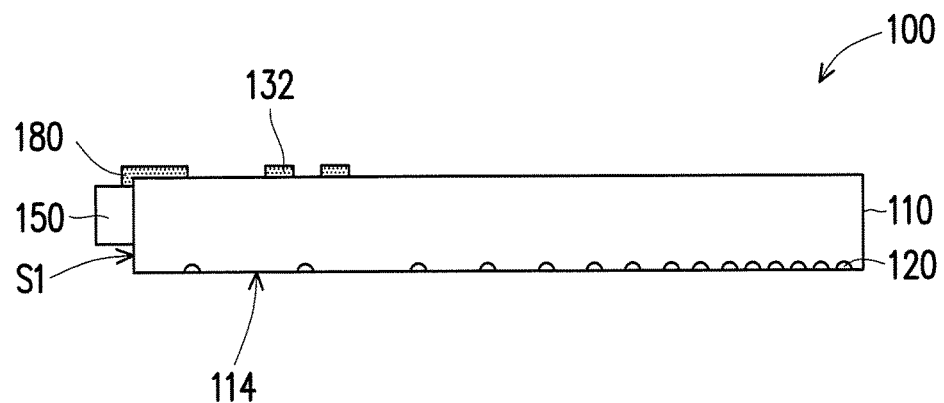
FIG. 2 is a cross sectional view of a light guide plate in another embodiment of the disclosure.

FIG. 2 is a cross sectional view of a light guide plate in another embodiment of the disclosure. In FIG. 2, the light guide plate 100 is configured for integrating at least one LED 150 at a lateral side of the light guide plate 100. In the present embodiment, the optical pattern 120 is disposed at the bottom surface of the base plate 110. The optical pattern 120 is formed by a plurality of microstructures. For front light module, the microstructures are concaves because (1) even if the thermal process may slightly deforming the shape of the concave, the deformation of the concave affects the luminance uniformity less than the deformation of the convex does, and (2) the concave may be further processed to be invisible to the naked eye, so as to avoid affecting the view of the EPD.

The microstructures may include a semi-random distribution of peaks and valleys, characterized by varying degrees of roughness. In other embodiments, a more controlled distribution of peaks and valleys of selected dimensions and densities may be employed. Under even more precisely controlled conditions, particular geometries, with tightly specified dimensions and distribution, may be employed.

In the present embodiment, a distance between adjacent two of the microstructures decreases from the lateral side S1, where the LED 150 is integrated, to an opposing side of the lateral side S1. In other words, the distribution density of the microstructures increases from the lateral side S1 to the opposing side of the lateral side S1, so as to achieve even light extraction efficiency.

Moreover, the light guide plate 100 further includes a third circuit 180 disposed above the base plate 110 and electrically connected to the LED 150. The related details have been described in U.S. Pat. Nos. 9,429,697, 9,429,702, 9,322,971, 9,004,737, 8,480,286 and 7,997,784, and the priority benefits are claimed.

Figure 3:
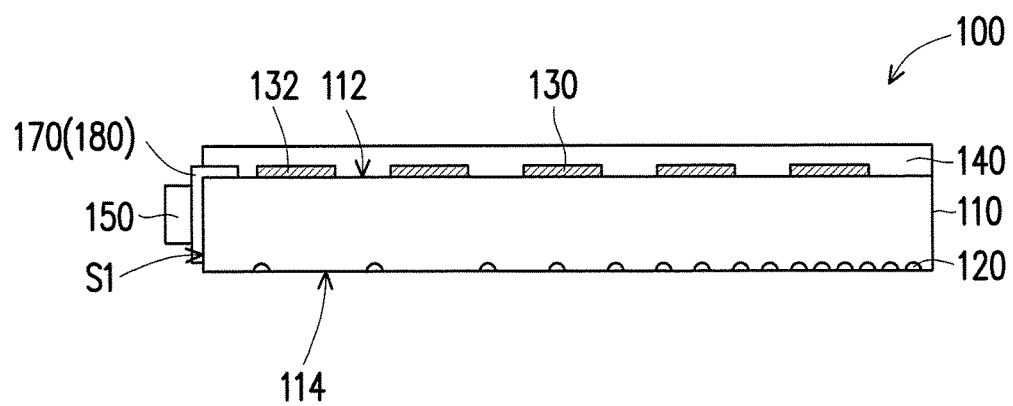
FIG. 3 is a cross sectional view of a light guide plate in yet another embodiment of the disclosure.

FIG. 3 is a cross sectional view of a light guide plate in yet another embodiment of the disclosure. In the present embodiment, the first circuit 130 may be a touch sensing circuit. To be more specific, the first circuit 130 may be a capacitive-type touch sensing circuit. Namely, the first circuit 130 may be a grid of electrodes composing a plurality of mutual capacitive sensors, which is integrated on the top surface 112 of the base plate 110. As such, when a finger or other conductive object comes into contact with the mutual capacitive sensors, the electrical capacitance between the electrodes changes, so as to track the position of the finger accordingly. Similarly, in one embodiment, the first circuit 130 may also be a resistive-type touch sensing circuit, which is integrated on the top surface 112 of the base plate 110. With such configuration, the touch sensing circuit for touch control may be integrated with the base plate 110 to form the light guide plate 100 with light guiding and touch control functions, such that the overall thickness of the electronic device using the light guide plate 100 may be reduced.

In this manner, the conventional material for the electrodes of the touch panel such as indium tin oxide (ITO) may not be adopted since the process temperature of ITO is too high, which would lead to thermal denaturation of the base plate 110. Accordingly, in the present embodiment, the first circuit 130 may be a nanowire circuit made by silver or cooper. The nanowire allows the first circuit 130 to be bendable with the base plate 110 without peeling off or cracking. On the other hand, ITO with a low process temperature ranging from 110° C. to 120° C. may also be adopted as the first circuit 130.

In FIG. 3, a first OCA layer 140, i.e. optical clear adhesive, is applied on the first circuit 130 to adhere a cover film for protecting the light guide plate 100 during cargo transportation, and the cover film is removed before a cover plate is mounted on the light guide plate 100 via the first OCA layer 140. Meanwhile, a flexible printed circuit (FPC) board 170 may also be applied on the light guide plate 100 before the light guide plate 100 is shipped to a panel factory by cargo transportation. Additionally, an optical clear adhesive with low refractive index may also be applied on the bottom surface 114 and further fill the optical pattern 120, and a cover film is also applied on the bottom surface 114 for cargo transportation.

Figure 4:
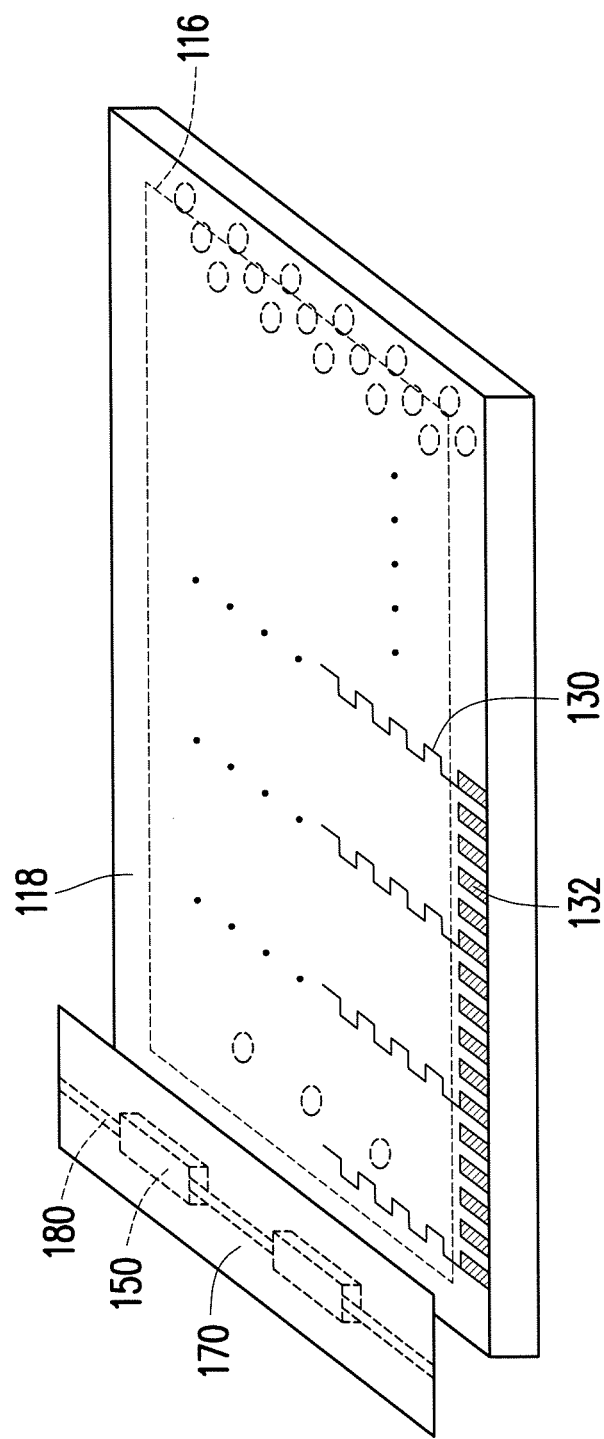
FIG. 4 is a schematic view of a light guide plate assembly applied to a reflective type panel in one embodiment of the disclosure.

FIG. 4 is a schematic view of a light guide plate assembly applied to a reflective type panel in one embodiment of the disclosure. It is noted that the FPC 170 is illustrated in a spreading manner in FIG. 4 for better illustration of the layout on the FPC 170. Also, for clarity of the figures, it is noted that the optical pattern 120, the first circuit 130, the second circuit 132 and the LED 150 in FIG. 4 are partially depicted for illustration purpose, the layout thereof is not limited in the disclosure. The first circuit 130 and the second circuit 132 are electrically connected. In detail, the second circuit 132 is performed as a trace circuit and arranged underneath the bezel of the front light module. The first circuit 130 may be made by metal mesh of nanowire or ITO with low process temperature. The LED 150 may be mounted on the FPC 170 and adjacent to the lateral side for light incidence, and the third circuit 180 may partially extended to the FPC 170.

In the present embodiment, the first circuit 130 is arranged in the visible area 116 of the reflective type panel, and the second circuit 132 is located in the invisible area 118 underneath the bezel of the panel frame. To be more specific, the second circuit 132 may be composed by low temperature curing silver paste, which may be formed on the top surface 112 of the base plate 110 by screen printing and developed to be low temperature curing. The low temperature curing silver paste with curing temperature ranging from 70° C. to 90° C. may also be applied as the second circuit 132.

Figure 5:
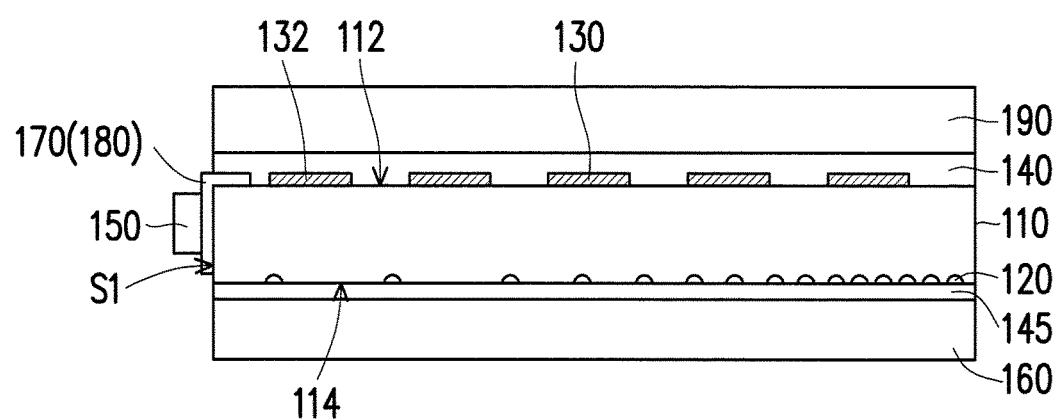
FIG. 5 is a cross section view of a light guide plate assembly applied to a reflective type panel in another embodiment of the disclosure.

FIG. 5 is a cross sectional view of a light guide plate assembly applied to a reflective type panel in another embodiment of the disclosure. In the present embodiment, the first OCA layer 140 is disposed above the base plate 110 and covers the first circuit 130, and the light guide plate assembly may further include a cover plate 190, such as a protecting glass, an anti-glare film or an anti-reflective film, disposed on the first OCA layer 140. Namely, the cover plate 190 is attached to the top surface 112 of the base plate 110 through the first OCA layer 140.

Moreover, the light guide plate assembly further includes a third circuit 180 disposed above the base plate 110 and electrically connected to the LED 150. To be more specific, the third circuit 180 is electrically connected to the LED 150 via the flexible printed circuit (FPC) board 170. In detail, the LED 150 may be mounted on the FPC board 170, and the third circuit 180 may be disposed on the FPC board 170 and electrically connected to the LED 150. The FPC board 170 is connected to the lateral side S1 so the light emitted by the LED 150 enters the base plate 110 via the lateral side S1. In one embodiment, the base plate 110 may include a recess located at the lateral side S1, and the LED 150 is integrated in the recess and electrically connected to the third circuit 180. It should be noted that the number of the LED 150 is not limited in the disclosure. In one embodiment, the LED 150 may be a LED light bar.

In the present embodiment, the light guide assembly further includes a second OCA layer 145 disposed at the bottom surface 114 of the base plate 110 and covering the optical pattern 120, such that the second OCA layer 145 is disposed between the bottom surface 114 of the base plate 110 and the reflective type panel 160, such as the EPD. Namely, the reflective type panel 160 may be attached to the bottom surface 114 of the base plate 110 via the second OCA layer 145.

In sum, the light guide plate assembly of the present disclosure is configured for integrating the LED at the lateral side thereof, and the first circuit and the second circuit are integrated on the top surface of the base plate and functions as the touch electrode circuit. With such configuration, the touch electrode circuit for touch control is integrated with the light guide plate to form the light guide plate assembly with light guiding and touch control functions. Also, in some embodiments, the LED is integrated at the lateral side of the light guide plate without having to be disposed on an additional circuit board. Therefore, the overall thickness and the production cost of the light guide structure may be reduced.

To be specific, the conventional front-light module is constituted by a light source and a light guide plate. The two opposite surfaces of the light guide plate are planar surfaces, and the light source is located at the light-incident side of the light guide plate. Besides, in order to fix its location and supply power, the light source requires a circuit board. The circuit board is often placed on one of the surfaces of the light guide plate. In addition, the circuit board may be extended outside the light guide plate and electrically and structurally connected to the light source. At this time, the overall thickness of the electronic device increases because of the circuit board placed on the surface of the light guide plate. In another aspect, if any other component is subsequently required to be placed in front of the light guide plate, the thickness of an optical adhesive layer for adhering the light guide plate to other components must be greater than the thickness of the circuit board, so as not to interfere with the circuit board. As a result, the overall thickness of the electronic device cannot be effectively reduced.

Figure 6:
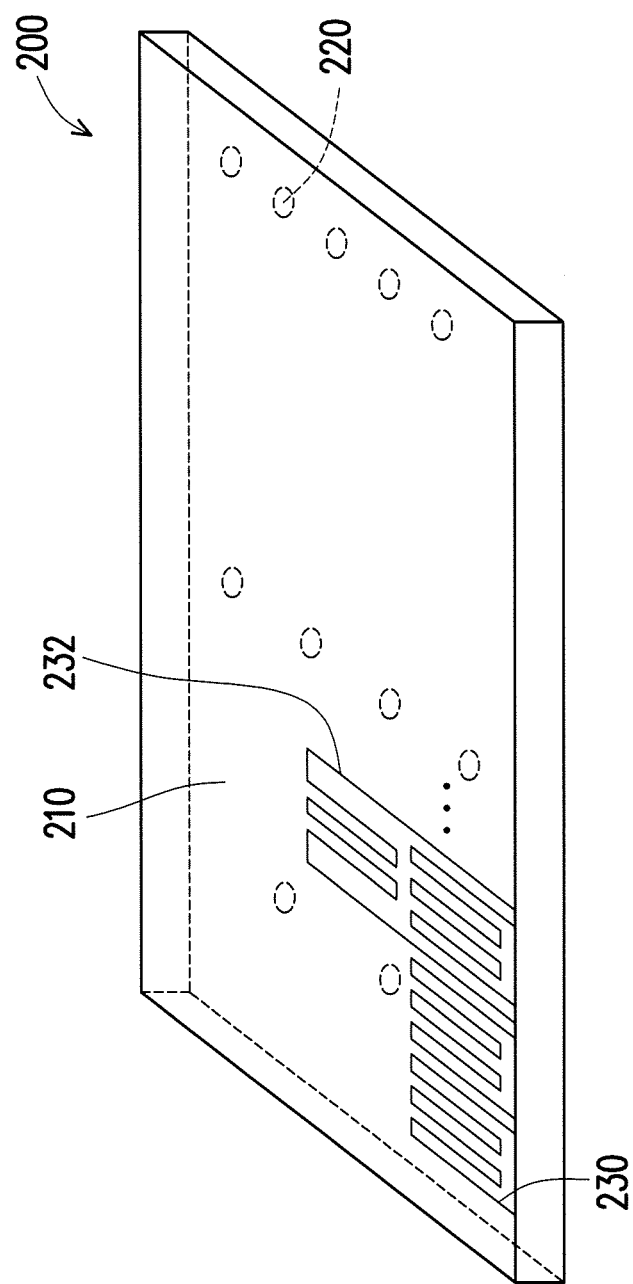
FIG. 6 is a schematic view of a light guide plate assembly applied to a penetrative type panel in one embodiment of the disclosure.

FIG. 6 is a schematic view of a light guide plate assembly applied to a penetrative type panel in one embodiment of the disclosure. For clarity of the figures, it is noted that the optical pattern 220, the first circuit 230, the second circuit 232 and in FIG. 6 are partially depicted for illustration purpose, the layout thereof is not limited in the disclosure. In FIG. 6, the light guide plate assembly 200 includes a light guide plate 210, an optical pattern 220 disposed at the bottom surface of the light guide plate 210, and a first circuit 230 and a second circuit 232 integrated on the top surface of the light guide plate 210. Herein, the first circuit 230 and the second circuit 232 are adjacent to each other but not electrically connected to each other.

In detail, the light guide plate assembly 200 may be applied underneath a penetrative type panel as a back light module. The first circuit 230 and the second circuit 232 are both arranged to form block shapes. Since the light guide plate assembly 200 is located underneath the penetrative type panel, such as the liquid crystal panel, the first circuit 230 and the second circuit 232 are required to allow light to pass through but not necessarily to be invisible to the naked eye. Therefore, the first circuit 230 and the second circuit 232 may be made by nanowires or silver paste previously described.

Meanwhile, since the light guide plate 210 is usually applied in large-sized panels, the materials suitable for roll to roll process should be stickier than that for injection process. To be more specific, the first circuit 230 and second circuit 232 may be composed by low temperature curing silver paste, which may be formed on the top surface of the light guide plate 210 by screen printing and developed to be low temperature curing. The first circuit 230 and second circuit 232 may include silver particles (tradename: DOT-ITE® FA-333, manufactured by Fujikura Kasei Co., Ltd., average particle diameter: 3 µm), and the curing temperature for the first circuit 230 and second circuit 232 may range from 70° C. to 90° C., so the thermal denaturation of the light guide plate 210 may be avoided. In one embodiment, the first circuit 230 and second circuit 232 may also be nanowires, and the diameter of the nanowires may be substantially less than 40 µm, so as to achieve transparent effect.

Figure 7:
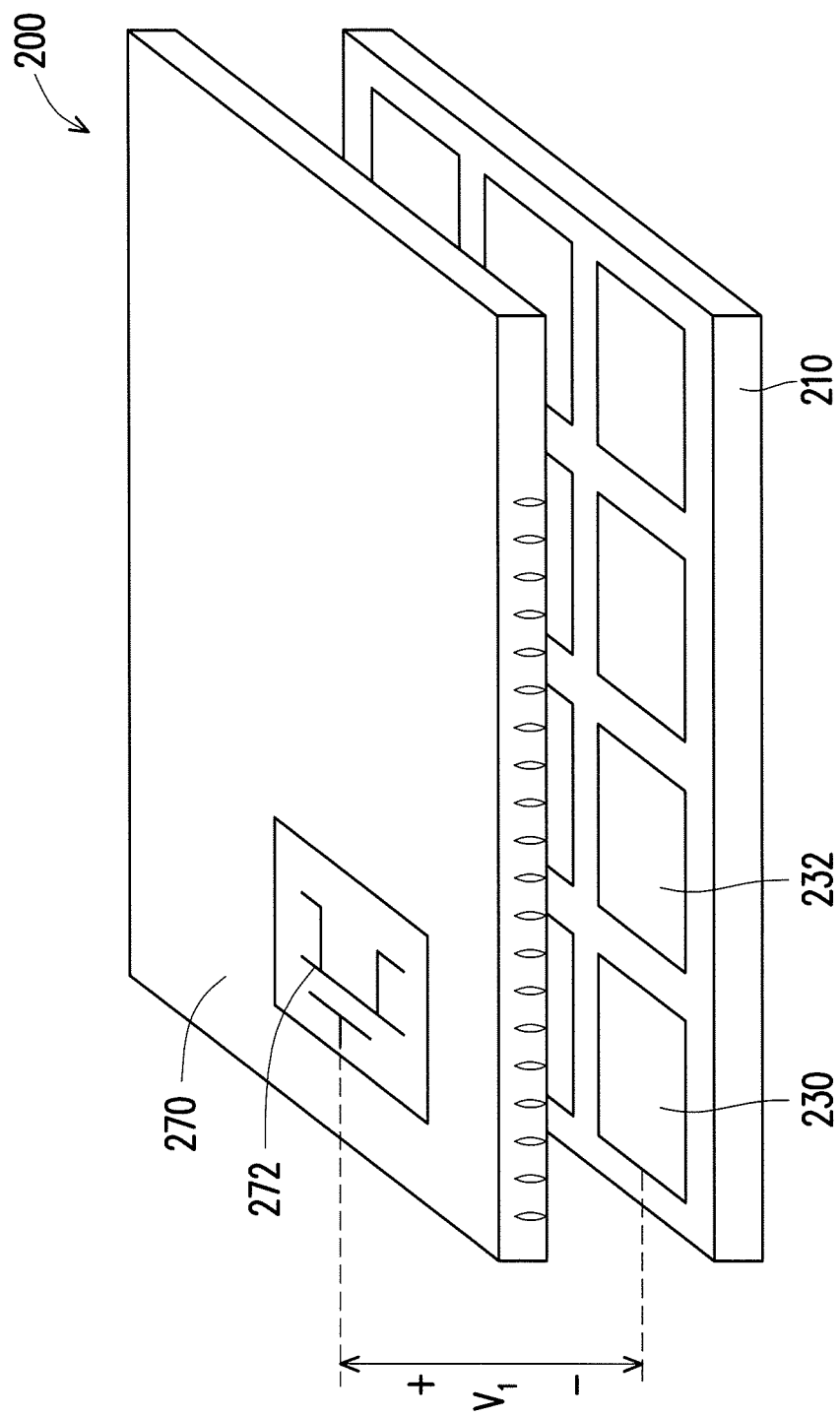
FIG. 7 is a schematic view of a light guide plate assembly applied to a penetrative type panel in another embodiment of the disclosure.

FIG. 7 is a schematic view of a light guide plate assembly applied to a penetrative type panel in another embodiment of the disclosure. In FIG. 7, the light guide plate assembly 200 further includes a liquid crystal cell plate 270 arranged above the light guide plate 210. In detail, a control circuit 272 may be disposed above the liquid crystal cell plate 270 in some embodiments. The control circuit 272 takes the first circuit 230 as a first locally ground voltage and generates a first electric field on the liquid crystal cell plate 270. At the same time, the control circuit 272 also takes the second circuit 232 as a second locally ground voltage and also generates a second electric field on the liquid crystal cell plate 270. Therefore, in some cases, the light guide plate assembly 200 achieves the local dimming mechanism by further controlling the block area, corresponding to the first circuit 230 and the second circuit 232, of the liquid crystal cell plate 270 to allow or block the light from the light guide plate 210.

Figure 8:
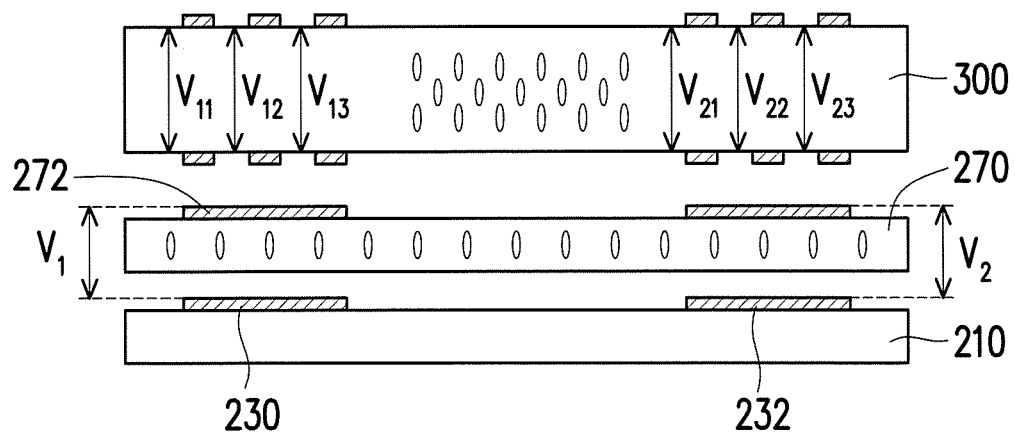
FIG. 8 is a cross section view of a light guide plate assembly applied to a penetrative type panel in yet another embodiment of the disclosure.

FIG. 8 is a cross sectional exploded view of a light guide plate assembly applied to a penetrative type panel in yet another embodiment of the disclosure. In some embodiments, the control circuit 272 is electrically connected to the penetrative type panel 300 by downgrading the resolution of the penetrative type panel 300. For instance, the control circuit 272 takes the first circuit 230 as a first locally ground voltage and also takes the second circuit 232 as a second locally ground voltage. Thus, a first electric field and a second electric field are correspondingly generated on the liquid crystal cell plate 279. Furthermore, the control circuit 272 may be designed to electrically connect the penetrative type panel, the resolution of the penetrative type panel 300 is much higher than that of the liquid crystal cell plate 270, and the control circuit 272 may takes several adjacent pixel voltages V11, V12 and V13 to generate a local dimming voltage V1 on and between the liquid crystal cell plate 270. It is thereby named downgrading the resolution of the penetrative type panel 300 for the control circuit 272.

To be more specific, the material of the light guide plate 210 must be light transmittable, suitable to be made in large size and also be able to tolerance the thermal process of adapting the first circuit 230 and second circuit 232 thereon. Accordingly, the adequate material for the light guide plate 210 may be the polycarbonate (PC), the thermoplastic olefin polymer of amorphous structure (tradename: COC®, manufactured by Topas Advanced Polymers Gmbh) or the cyclic block copolymer (tradename: CBC®, manufactured by Puratran™). In detail, the above-mentioned material suitable for the light guide plate 210 is capable of bearing temperature up to 150° C. without being deteriorated by the heat. Therefore, ITO with low process temperature ranging from 110° C. to 120° C. may be adopted as the material for the first circuit 230 and the second circuit 232. Moreover, the ITO with general process temperature ranging from 130° C. to 140° C. may also be adopted as the material for the first circuit 230 and second circuit 232. Accordingly, the light guide plate 210 of the present embodiment is applied underneath the penetrative type panel 300 as a back light module. Accordingly, for the light guide plate 210 applied underneath the penetrative type panel 300 as a back light module, the optical pattern 220 may be microstructures including concave and/or convex.

It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A light guide plate, for integrating a LED at the lateral side of said light guide plate, and for being disposed above a reflective type panel, comprising:
   a base plate;
   an optical pattern disposed at the bottom surface of said base plate;
   a first circuit integrated on the top surface of said base plate and being optical penetrable; and
   a second circuit integrated around said first circuit and electrically connecting to said first circuit.

2. The light guide plate of claim 1, wherein said base plate is made by the material selected from a group consisting of polycarbonate (PC), polyethylene terephthalate (PET), polystyrene (PS) and polymethyl methacrylate (PMMA).

3. The light guide plate of claim 1, wherein said first circuit is a capacitive-type touch sensing circuit.

4. The light guide plate of claim 1, wherein said first circuit is a resistive-type touch sensing circuit.

5. The light guide plate of claim 1, wherein said first circuit is a nanowire circuit.

6. The light guide plate of claim 1, further comprising a third circuit disposed above said base plate and electrically connected to said LED.

7. The light guide plate of claim 6, wherein said third circuit is electrically connected to said LED via a flexible printed circuit (FPC) board.

8. A light guide plate assembly, being applied above a reflective type panel, comprising:
   a light guide plate of claim 1;
   a first optical clear adhesive layer disposed above said top surface and covering said first circuit to adhere a cover plate; and
   a second optical clear adhesive layer disposed below said bottom surface and covering said optical pattern to adhere said reflective type panel.

9. The light guide plate assembly of claim 8, wherein said base plate is made by the material selected from a group consisting of polycarbonate (PC), polyethylene terephthalate (PET), Polystyrene (PS) and Polymethyl methacrylate (PMMA).

10. The light guide plate assembly of claim 8, wherein said first circuit is a capacitive-type touch sensing circuit.

11. The light guide plate assembly of claim 8, wherein said first circuit is a resistive-type touch sensing circuit.

12. The light guide plate assembly of claim 8, wherein said first circuit is a nanowire circuit.

13. The light guide plate assembly of claim 8, further comprising a third circuit disposed above said base plate and electrically connected to said LED.

14. The light guide plate assembly of claim 13, wherein said third circuit is electrically connected to said LED via a flexible printed circuit (FPC) board.

15. A light guide plate assembly, for being applied underneath a penetrative type panel, comprising:
   a light guide plate for integrating a LED at the lateral side of said light guide plate;
   an optical pattern disposed at the bottom surface of said light guide plate;
   a first circuit integrated on the top surface of said light guide plate; and
   a second circuit integrated on said top surface and adjacent to but not electrically connected to said first circuit.

16. The light guide plate assembly of claim 15, wherein said light guide plate is made by the material selected from a group consisting of polycarbonate (PC), thermoplastic olefin polymer of amorphous structure (COC) and cyclic block copolymer (CBC).

17. The light guide plate assembly of claim 15, wherein said first circuit is a silver paste circuit.

18. The light guide plate assembly of claim 15, further comprising a liquid crystal cell plate arranged above said light guide plate.

19. The light guide plate assembly of claim 18, further comprising a control circuit disposed above said liquid crystal cell plate, and taking said first circuit as a first locally ground voltage to generate a first electric field on said liquid crystal cell plate.

20. The light guide plate assembly of claim 19, wherein said control circuit is electrically connected to said penetrative type panel by downgrading the resolution of said penetrative type panel.

* * * * *